United States Patent [19]

Prak

[11] 3,875,430

[45] Apr. 1, 1975

[54] CURRENT SOURCE BIASING CIRCUIT

[75] Inventor: Jan Willem L. Prak, Cupertino, Calif.

[73] Assignee: Intersil, Inc., Cupertino, Calif.

[22] Filed: July 16, 1973

[21] Appl. No.: 379,351

[52] U.S. Cl. .................... 307/297, 307/304, 323/2, 323/4

[51] Int. Cl. .......................... H03k 1/02, H03k 1/12

[58] Field of Search ........... 307/296, 297, 304, 315; 323/1, 2, 4, 16, 22 R

[56] References Cited

UNITED STATES PATENTS

| | | | |
|---|---|---|---|
| 3,209,214 | 9/1965 | Murphy et al. | 307/315 X |
| 3,210,677 | 10/1965 | Changlin et al. | 307/315 X |
| 3,299,291 | 1/1967 | Warner, Jr. et al. | 307/214 X |
| 3,303,413 | 2/1967 | Warner, Jr. et al. | 307/318 X |
| 3,452,287 | 6/1969 | Busch et al. | 307/304 X |
| 3,508,084 | 4/1970 | Warner, Jr. | 323/22 R |
| 3,571,694 | 3/1971 | Hunger et al. | 323/4 |
| 3,577,063 | 5/1971 | Hurd | 323/16 |
| 3,628,070 | 12/1971 | Heuner et al. | 307/304 |

OTHER PUBLICATIONS

Maitland, "N- or P-Channel MOS:" Electronics (pub.), 8/3/1970, pp. 79–82.

Lancaster, "Using the New Constant-Current Diodes," Electronic World (pub), 10/1967; pp. 30, 31 & 78.

Baitinger et al., "Constant-Current Source Network," IBM Tech. Discl. Bull.; Vol. 13, No. 9, pp. 2516; 2/1971.

Beilstein, "Regulated Mosfet Power Supply Device," IBM Tech. Discl. Bul., Vol. 15, No. 3, pp. 817–818, 8/1972.

*Primary Examiner*—Martin H. Edlow
*Assistant Examiner*—L. N. Anagnos
*Attorney, Agent, or Firm*—Gregg, Hendricson & Caplan

[57] ABSTRACT

A first field effect transistor is employed as a current source with another like field effect transistor biased close to the threshold voltage thereof connected through a semiconductor junction to the gate of the first field effect transistor so that the current output of the source is substantially independent of supply voltage variations and the turnon voltage of the first field effect transistor is determined by the forward voltage of the junction.

8 Claims, 6 Drawing Figures

CURRENT SOURCE BIASING CIRCUIT

BACKGROUND OF INVENTION

It is conventional in many integrated circuit applications to provide a current source as a field effect transistor with the drain and source thereof connected between voltage supply and current output and the gate connected to voltage supply. With such a current source the output current is dependent upon the supply voltage in a square law relationship. While this may be satisfactory for some applications, it is highly disadvantageous for other applications such as, for example, electronic timepieces.

There has been made a material advancement in stable oscillators for electronic timepieces and the like and employing a novel and highly stable current source disclosed and claimed in U.S. Pat. application Ser. No. 379,639 by David Bingham entitled "Stable Current Source", and now abandoned. This improved current source provides a combination of diodes or transistor junctions to apply a stable gate voltage to the field effect transistor such that the current output is substantially independent of changes in supply voltage. The actual current value of the source of this development is, however, dependent on the turnon or threshold voltage of the field effect transistor and, consequently, this threshold voltage must be rigidly controlled to obtain currents in desired ranges.

The present invention provides an improvement in the art including the above-identified invention of David Bingham to the end of materially limiting the dependency of the output current on the threshold voltage of individual field effect transistors.

SUMMARY OF INVENTION

The present invention provides a stable current source including a first field effect transistor connected with source and drain between supply voltage and current output. A like second field effect transistor is biased to conduct near threshold by connecting a resistor in series therewith across supply voltage. A semiconductor junction, provided as a diode for example, is connected from the output of the second field effect transistor to the gate of the first field effect transistor to thus establish the turn-on voltage of the first field effect transistor as substantially the forward voltage of the semiconductor junction.

The present invention provides for operating a field effect transistor current source in the exponential portion of the current-voltage relationship of the device. By this means the square law relationship of current to supply voltage is overcome and a much more independent current output is obtained. Additionally, the present invention provides a second field effect transistor substantially identical to the first which, together with a semiconductor junction, provides the gate voltage of the first field effect transistor to thereby make the output current much less dependent upon variations in threshold voltage between different field effect transistors. Preferably, the field effect transistors are integrated in a single circuit and are even formed at the same time by the same process.

The present invention is particularly adapted to MOS and CMOS fabrication. All elements of the current source of this invention may be made in integrated circuit. In a typical example of the present invention employing P-channel MOSFETs the resistors employed in the biasing circuitry of the current source field effect transistor may be implemented as N-channel transistor with low width-to-length ratios. It is also possible in accordance herewith to obtain current multiplication and all of the foregoing is particularly adapted to low power and other CMOS technology circuits.

DESCRIPTION OF FIGURES

The present invention is illustrated as to preferred embodiments thereof in the accompanying drawings, wherein.

DESCRIPTION OF PREFERRED EMBODIMENTS

Figure 1:
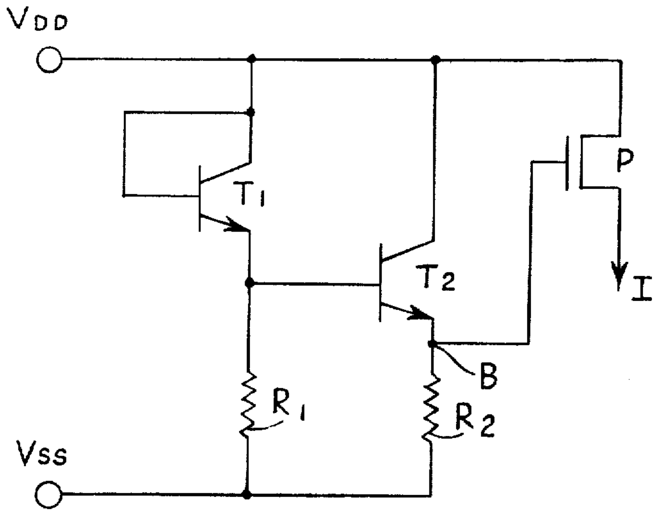
FIG. 1 PRIOR ART
FIG. 1 is a schematic illustration of a prior art stabilized current source.

The present invention comprises an improvement over the prior art circuit of FIG. 1 described and claimed in the above-identified patent application of David Bingham. In this circuit the gate voltage for the field effect transistor P is provided by a pair of semiconductor junctions comprised in the illustrated circuit as the base-emitter junctions of transistors $T_1$ and $T_2$ which provides a substantially stable voltage at point B for application to the gate of the FET. The exponential characteristic of the diodes or semiconductor junctions of FIG. 1 provides for this stable gate voltage. Consequently, the circuit of FIG. 1 provides an output current I which is substantially independent of changes in the supply voltage. The value of the output current I is, however, dependent upon the threshold voltage or turn-on voltage of the FET. Consequently, it is necessary to rigidly control the FET threshold voltage in order to obtain output currents in a desired range.

Figure 2:
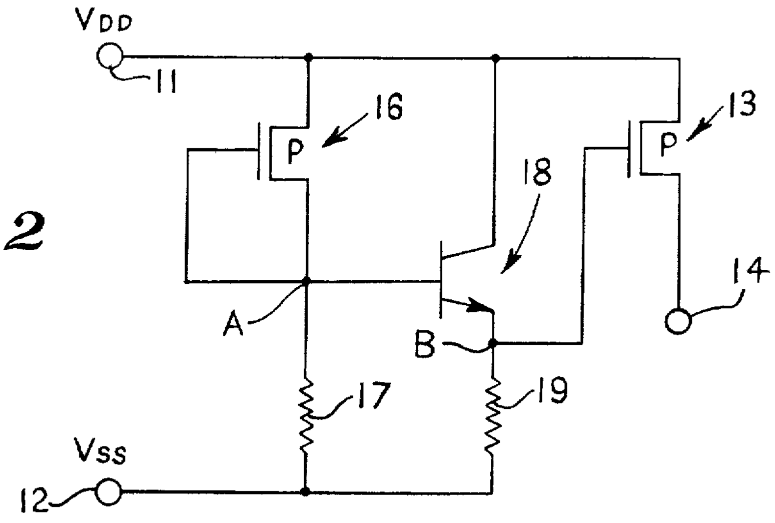
FIG. 2 is a schematic illustration of a current source circuit in accordance with the present invention.

The present invention provides a material improvement over the prior art circuitry of FIG. 1 by making the output current substantially less dependent upon the FET threshold voltage. Referring now to FIG. 2, there will be seen to be provided a circuit including a positive power supply terminal 11 and a negative power supply terminal 12 with the positive power supply voltage being denominated $V_{DD}$ and the negative power supply voltage being denominated $V_{SS}$. A P-channel MOSFET 13 is connected between $V_{DD}$ and a current output terminal 14. In distinction to the prior art, the circuit of the present invention as illustrated in FIG. 2 incorporates a second P-channel field effect transistor 16 having the source connected to terminal 11 and the drain connected through a resistor 17 to terminal 12. The gate of device 16 is connected to the drain which is also connected to the base of NPN transistor 18 having the collector connected to terminal 11 and the emitter connected through a resistor 19 to terminal 12. The emitter of transistor 18 is connected to the gate of field effect transistor 13. For convenience of discussion, there are identified in FIG. 2, point A at the drain of transistor 16 and point B at the emitter of transistor 18.

Considering now the operation of the circuit of FIG. 2, it is first noted that the field effect transistors or MOSFETs 13 and 16 are preferably integrated on the same circuit so that their threshold voltages are substantially identical. In actual practice, the two MOSFETs 13 and 16 may be formed at the same time on the same die with the same masking and diffusion procedures so as to establish a substantial identity between the threshold voltages of these two devices. The device 16 is biased by the resistor 17 to an operating point in the exponential part of the transistor characteristic, i.e., that low voltage start-up condition of conduction which has oftentimes been relatively ignored but which does exist in the operating characteristic of field effect transistors. In this exponential region of operation there is an exponential variation between the relationship of voltage and current which changes with increasing voltage but which at no time is any greater than a square law relationship. By proper choice of the physical size of the device and value of the resistor 17 the voltage at point A may be made very close to the threshold voltage of MOSFET 16 and, thus, to the threshold voltage of MOSFET 13. This condition pertains over a wide range of operating voltages. Consequently, transistor 18 acting as a diode in this instance will cause the voltage at point B to be a one diode-drop below the threshold voltage of MOSFET 16 over a wide range of supply voltages and threshold voltages. Consequently, it will be seen that the output current at terminal 14 is far less dependent upon changes in threshold voltage from device to device than the prior art circuit of FIG. 1. It will be noted that the stability of the current source at FIG. 2 is slightly less than that of FIG. 1, inasmuch as the exponential characteristic of MOSFET 16 is less steep than that of a semiconductor junction such as a diode by an amount depending upon the manufacturing process. It is furthermore noted, however, that the reduction in stability by the utilization of the MOSFET 16 in place of a diode is quite small. The improvement in the material reduction in dependence upon changes in threshold voltage provides a material advancement in the art and enables the production of truly stable current sources in MOS technology.

It is noted that the transistor 18 of FIG. 2 may be readily integrated in MOS or CMOS technology and for a discussion of same, reference is made to the above-noted prior art patent application of David Bingham.

Figure 3:
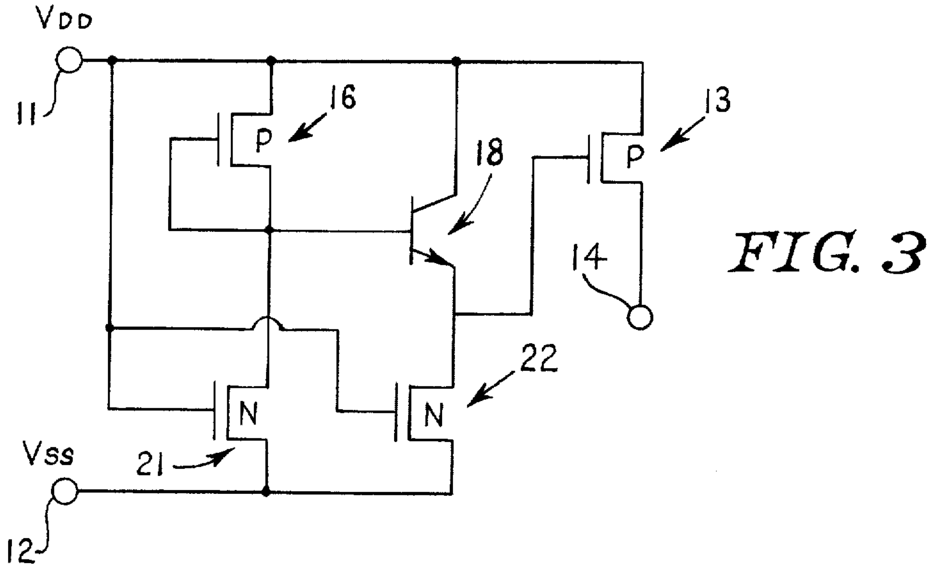
FIG. 3 is a schematic illustration of the circuit of FIG. 2 with the resistors thereof formed as N-channel transistors.

In FIG. 3 there is illustrated the same circuit as FIG. 2 wherein the resistors 17 and 19 are implemented as N-channel transistors in MOS. Elements of FIG. 3 which are the same as FIG. 2 are accorded the same numbers. It will be seen that the drain of MOSFET 16 is connected to the drain of an N-channel MOSFET 21 having the source thereof connected to $V_{SS}$ and gate connected to $V_{DD}$. Similarly the resistor 19 is replaced by an N-channel MOSFET 22 having the source-drain connections between the emitter of transistor 18 and $V_{SS}$ and the gate connected to $V_{DD}$. Both of the field effect transistors 21 and 22 have low width-to-length ratios in order to establish a desired resistance thereof. MOSFET 16 has a large width-to-length ratio and width-to-length ratio of MOSFET 13 is determined by the current desired from the circuit.

Figures 4, 5:
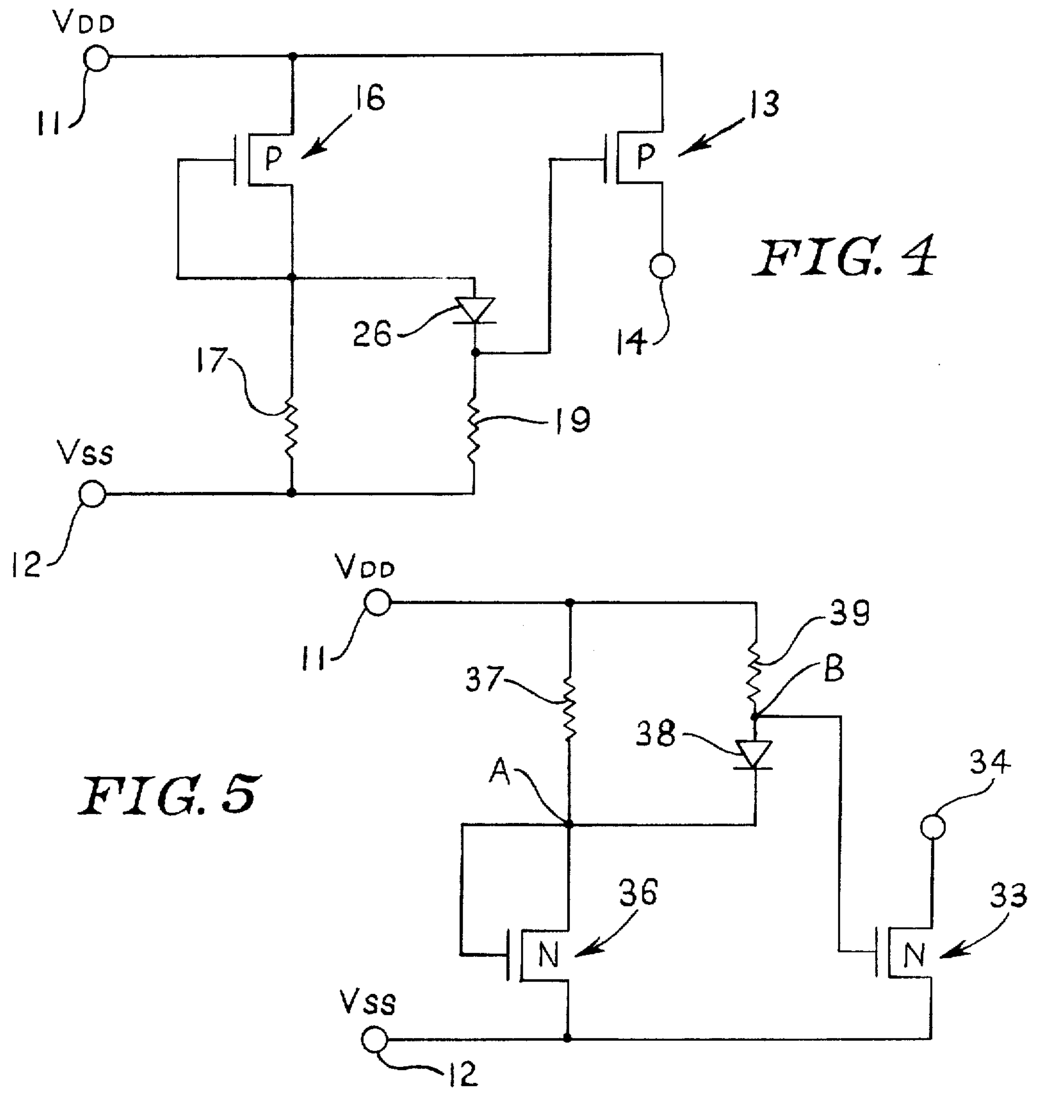
FIG. 4 is an illustration of the circuit of FIG. 2 with a diode replacing the NPN transistor.
FIG. 5 illustrates a current source in accordance with the present invention employing N-channel field effect transistors rather than P-channel as illustrated in FIG. 2.

FIG. 4 of the drawings illustrates a circuit in accordance with the present invention wherein the NPN transistor 18 is replaced by a semiconductor diode 26. The remaining elements in connection with the circuit of FIG. 4 are the same as the circuit of FIG. 2 and these elements are identically numbered. It is not believed necessary to describe the operation of FIG. 4 inasmuch as it follows directly from the previous description of FIG. 2.

FIG. 5 illustrates the current source biasing circuit of the present invention implementing an N-channel MOS rather than P-channel as in FIG. 2. Referring now to FIG. 5 there will be seen to be provided a first N-channel MOSFET 33 having source and drain connected between $V_{SS}$ and the current output terminal 34. A second N-channel MOSFET 36 has the source thereof connected to $V_{SS}$ and the drain connected through a resistor 37 to $V_{DD}$. The gate of the N-channel transistor 36 is connected to the drain and also to a diode 38 connected through a resistor 39 to $V_{DD}$. The forward conducting side or anode of diode 38 is connected to the gate of N-channel transistor 33. It will be seen that the circuit of FIG. 5 is substantially the reverse of the circuit of FIG. 2 with the substitution of a diode in place of a transistor 18; however, these two elements are interchangeable inasmuch as both comprise in the present circuits a semiconductor junction between points A and B. In this case point B is a diode-drop above point A for a wide range of supply voltages and threshold voltages. Consequently, the output current is little dependent upon changes in threshold voltages from device to device in the same manner as the circuit of FIG. 2.

Figure 6:
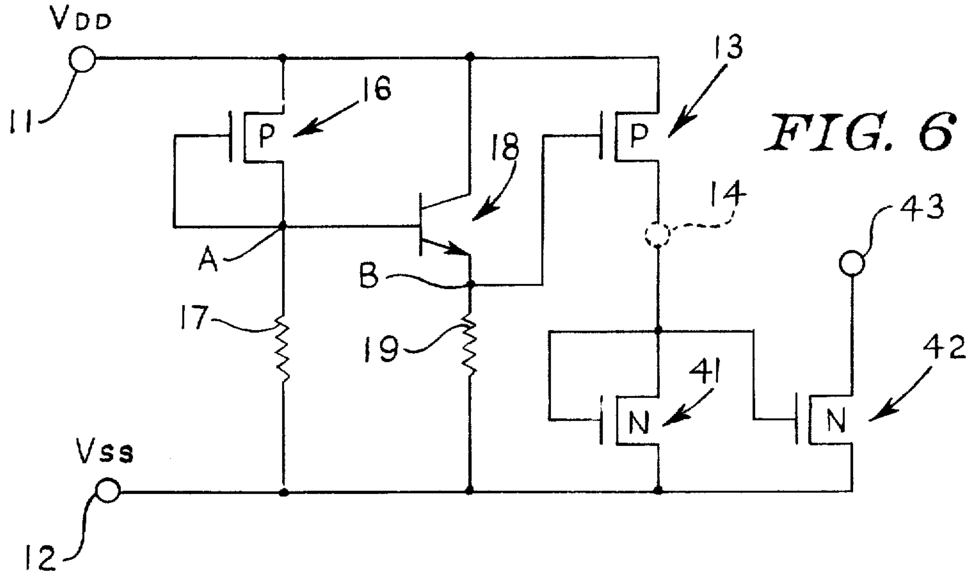
FIG. 6 schematically illustrates the circuit of FIG. 2 referenced to the negative voltage supply and including current multiplication.

It is possible in accordance with the present invention also to provide a current referenced to the negative voltage supply by current multiplication as illustrated in FIG. 6. Elements in connections of a circuit of FIG. 6 which are identical to FIG. 2 are similarly numbered. It will be seen by reference to FIG. 6 that the left and upper portion thereof is identical to the circuit of FIG. 2 and the current at a point 14 is then the same current at the output terminal 14 of FIG. 2. In this circuit, however, there is connected to the point 14 the drain of an N-channel transistor 41 having the source thereof connected to $V_{SS}$ and the gate thereof connected back to the drain. A second N-channel transistor 42 has the source thereof connected to $V_{SS}$ and the drain connected to current output terminal 43. The gate of transistor 42 is connected to point 14.

It will be seen that this combination of N-channel transistor 41 and 42 provides for the reversal of current flow from the circuit, i.e., current flow from $V_{SS}$ rather than from $V_{DD}$. Furthermore, this added circuitry provides for current multiplication if desired. The relationship of current at point 14 and terminal 43 is determined by the ratio of width-to-length ratios of N-channel transistors 41 and 42. Thus, for example, if transistor 42 has a width-to-length ratio that is three times the width-to-length ratio of transistor 41, the current out of terminal 43 will be three times the current at point 14.

Although there has been set forth above a number of variations of the present invention, it will be appreciated to those skilled in the art that numerous additional modifications and variations are possible within the scope of the present invention. It will also be seen that the present invention is particularly adapted to integrated circuit MOS and CMOS techniques. It is not intended to limit the present invention to the details of illustration or precise terms of description.

What is claimed is:

1. A current source comprising:

a first field effect transistor connected to a first voltage supply terminal and a current output terminal, a second like field effect transistor having substantially the same threshold voltage as said first field effect transistor connected in series between first and second voltage supply terminals and biased to conduct in the exponential part of the current-voltage part of the transistor characteristic, a semiconductor junction coupling said second transistor to the gate of said first transistor, and means resistively coupling the gate of said first transistor to said second voltage supply terminal for establishing the gate voltage of said first transistor as the threshold voltage of said second transistor minus the semiconductor junction voltage, whereby the output current is little dependent upon threshold voltage.

2. The circuit of claim 1 further defined by said semiconductor junction comprising a semiconductor diode.

3. The circuit of claim 1 further defined by said semiconductor junction comprising one junction of a transistor in which said transistor is connected in series with a resistor across said first and second voltage supply terminals.

4. The circuit of claim 1 further defined by said transistors being P-channel MOSFETs with each having the sources connected to said first voltage supply terminal which is a positive voltage terminal.

5. The circuit of claim 4 further defined by a resistor connected in series with said second transistor for biasing such transistor.

6. The circuit of claim 5 further defined by said resistor comprising an N-channel MOSFET having a small width-to-length ratio and the gate thereof connected to said first voltage supply terminal.

7. The circuit of claim 4 further defined by:

a first N-channel MOSFET connected between said current output terminal and said second negative voltage supply terminal with the gate thereof connected to the drain, and a second N-channel MOSFET connected between said second power supply terminal and a second current output terminal with the gate thereof connected to the gate of the first N-channel MOSFET to produce a stable current at said second output terminal referenced to negative power supply.

8. An integrated circuit MOS stable current source having first and second opposite polarity voltage supply terminals adapted for connection across a low voltage supply having an output subject to variation comprising:

a first MOSFET device connected at source and drain between said first voltage supply terminal and a current output terminal, a second MOSFET device having substantially the same threshold voltage as said first MOSFET device connected at source and drain in series with a resistance between said first and second voltage supply terminals and having the gate thereof connected to the juncture of device and resistance, with said device being biased by said resistance to conduct in the exponential part of the device characteristic, said first and second devices having substantially the same threshold voltages, and a single semiconductor junction connected between the gate of said first device and the gate of said second device, whereby the gate voltage of said first device is substantially equal to the threshold voltage of the second device minus the semiconductor junction voltage to provide a stable output current at said output terminal having little dependency upon device threshold voltages.

* * * * *